Fig. 1

F. David Hurlston
INVENTOR.

BY Edward M. Roney
ATTORNEY

Fig. 2A

F. David Hurlston
INVENTOR.

BY Edward M. Roney
ATTORNEY

CHANNEL A  Fig. 3A

CLOCK PULSES  Fig. 3B

UP

CHANNEL B  Fig. 3C

NORMAL OUTPUT OF F-F 63  Fig. 3D

Δ Lm  Fig. 3E

CHANNEL A  Fig. 4A

CLOCK PULSES  Fig. 4B

DOWN

CHANNEL B  Fig. 4C

NORMAL OUTPUT OF F-F 63  Fig. 4D

Δ Lm  Fig. 4E

F. David Hurlston
INVENTOR.

BY Edward M. Roney

ATTORNEY

United States Patent Office 3,566,478
Patented Mar. 2, 1971

3,566,478
DEPTH CONTROL METHODS AND APPARATUS FOR BOREHOLES
F. David Hurlston, Houston, Tex., assignor to Schlumberger Technology Corporation, New York, N.Y.
Filed June 24, 1968, Ser. No. 739,330
Int. Cl. G01b 3/02
U.S. Cl. 33—142                                   18 Claims

ABSTRACT OF THE DISCLOSURE

In accordance with an illustrative embodiment of the invention, methods and apparatus for accurately determining the true depth of a tool supported in a borehole by an elastic cable are described. To accomplish this, a sheave wheel at the surface of the earth measures cable movement and generates pulses representative of incremental cable movement. The tension on the cable at the surface of the earth is measured and used in combination with certain calibration corrections to generate correction pulses which are either added to or subtracted from the incremental cable movement pulses to produce corrected cable movement pulses. These corrected pulses can then be used to drive a suitable recording device as a function of true cable movement or to cause reference marks to be placed on the cable so that the cable can be later used for depth control purposes apart from the pulse correction computing system.

---

This invention relates to methods and apparatus for determining the length of an elastic cable under tension and more particularly to methods and apparatus for determining the true position of a tool suspended on the end of an elastic cable as the tool on the end of the cable is moved up and down.

This invention is particularly adapted for use in the logging of an earth borehole where measurements of the surrounding subsurface earth formations are taken at different depth levels throughout the borehole by means of a measuring device which is lowered into the borehole on the end of an elastic cable extending from the surface of the earth. Typically, the measurements taken along the length of the borehole are intended to provide indications of oil or gas bearing strata. Therefore, the depth of the measuring device below the surface of the earth must be accurately determined so that the measurements may be accurately correlated with the true depth of the measuring device in the borehole.

To determine the depth of a measuring device in a borehole, a means of determining the length of cable that is lowered into the borehole may be utilized to count the actual number of feet of cable lowered into the borehole. Many devices have been proposed for measuring this cable length. Some of these are sheave devices located at the surface of the earth which provide a measurement of the length of cable which passes over the sheave. Other systems utilize a sensing device responsive to magnetic marks on the cable along the length thereof, which systems measure the length between the magnetic marks as the cable is being paid out or taken in.

However, there are forces that work on the measuring device and cable within the borehole which sometimes cause these cable length indicating devices to give readings which do not have a desired accuracy. Some of these forces include the weight of the measuring device in the cable, the buoyant force of the drilling mud in the borehole, and the drag or frictional forces applied by both the drilling mud and the wall of the borehole to both the cable and measuring device. One proposed system which overcomes these problems to accurately and continuously determine the true position of a measuring device in a borehole can be found in U.S. Pat. No. 3,497,958 issued to L. H. Gollwitzer on Mar. 3, 1970.

The present invention represents certain improvements over this copending Gollwitzer application which improvements are primarily concerned with various simplifications of the methods and apparatus disclosed in this copending Gollwitzer application.

It is an object of the present invention therefore to provide new and improved depth determining methods and apparatus for use with tools lowered into a borehole on the end of an elastic cable.

It is a further object of the invention to provide new and improved methods and apparatus for accurately determining the depth of a tool on the end of an elastic cable in a borehole, which new methods and apparatus are relatively simple and inexpensive to implement.

In accordance with the present invention, depth control methods and apparatus comprise generating a first signal representative of the movement of a cable which supports a tool in a borehole. A second signal representative of a cable length correction function is generated which second signal is combined with the first signal to produce a third signal which is more accurately representative of cable movement. The third signal can then be used to place a reference mark on the cable. Desirably, the first, second and third signals are in the form of pulses where each pulse is representative of a given increment of cable travel. The corrected pulses of the third signal can then be counted and magnetic reference marks placed on the cable at predetermined cable length intervals. By so doing, the marked cable can thereafter be used by itself to accurately determine cable length.

In addition to marking cables, the present invention can alternatively be used to accurately determine the depth of a tool in a borehole so as to, for example, accurately drive a recording mechanism.

In one manner of correction of cable length pulses (first signal) with the correction pulses (second signal), a bistable means can be set by the correction pulses and reset by the cable length pulses with the bistable means controlling whether the cable length pulses are inhibited or not.

In another manner of correction in accordance with an alternative form of the invention, a tension measurement can be combined with signals representative of cable movement to produce digitized signals. These digitized signals can then be compared in a digital subtractor with another digital signal to produce correction pulses for combination with the cable length pulses when the two digital signals are unequal. These correction pulses are then counted by a bidirectional counter to produce the other digital signal. The sign bit contained in the digital subtractor can be used to steer the bidirectional counter.

For a better understanding of the present invention, together with other and further objects thereof, reference is had to the following description taken in connection with the accompanying drawings, the scope of the invention being pointed out in the appended claims.

Referring to the drawings:
Referring to FIG. 1, there is shown a tool 10 lowered in a borehole 11 on the end of an elastic cable 12 for investigating subsurface earth formations 13. The borehole 11 is usually filled with a drilling mud 14. At the surface of the earth the cable 12 passes over a sheave wheel 13a which is supported by an arm 14a to a suitable fixed point 15 and which arm 14 includes a tension measuring device 16 for providing output signals to a calibrated meter 29 representative of the amount of tension on the cable 12 at the surface of the earth. The cable 12 is routed under another sheave wheel 17 to the cable reeling device (not shown). A pair of rollers 18 engage the cable 12 on two sides thereof so that a mechanical shaft 19 which is connected to one of the rollers 18 can drive a suitable recording device 20 and its associated footage counter 28 by way of a differential gear 21 and output shaft 24. A suitable slip ring arrangement (not shown) picks off the electrical signals generated from the investigating tool 10 and supplies the signals to suitable signal processing circuits 22 and then to the recorder 20 to provide a log of the measurements made by the tool 10 as a function of borehole depth.

Figure 1:
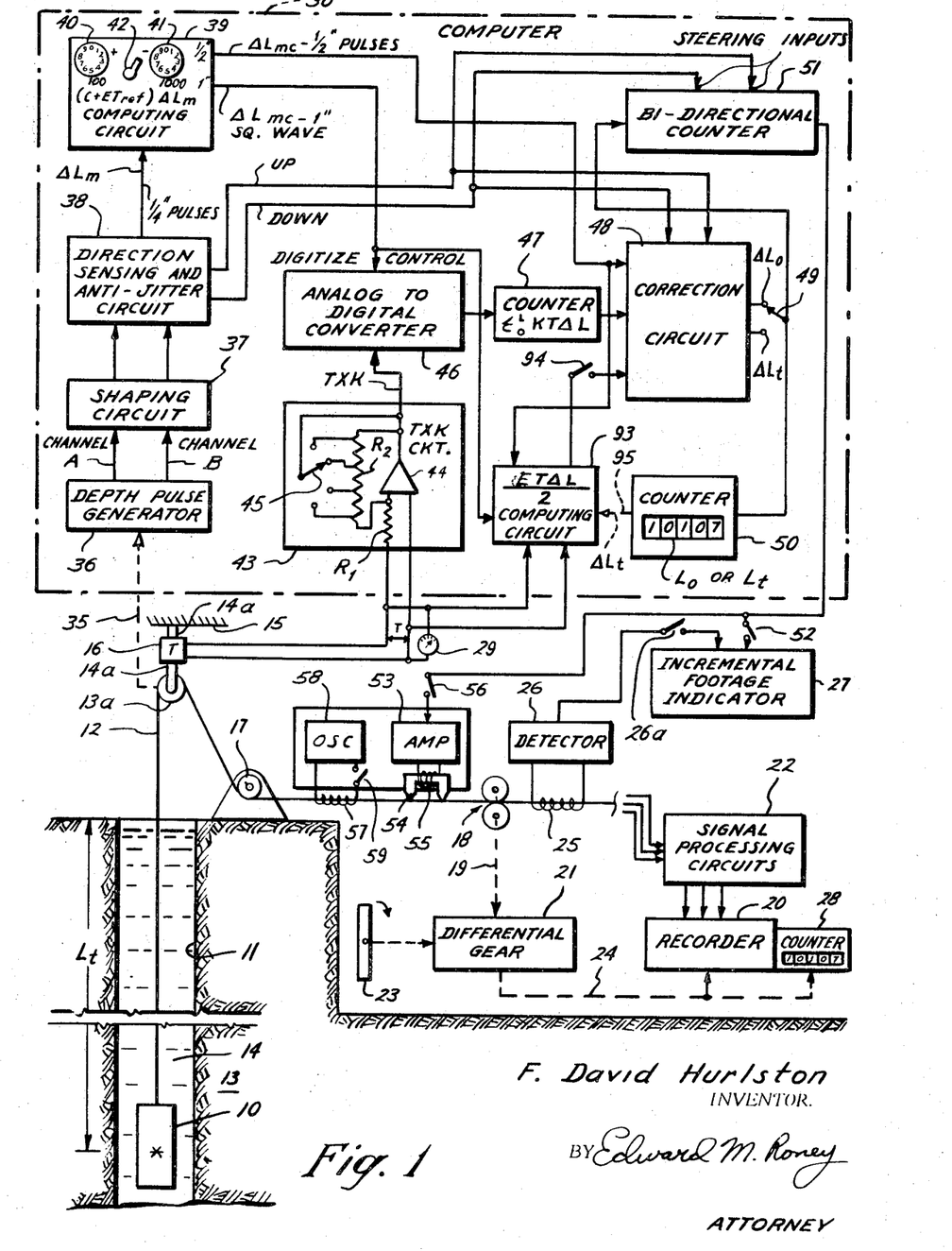
FIG. 1 shows a tool supported by a cable in a borehole along with schematic representation of a system for accurately determining the depth of a tool in a borehole and, if desired, placing reference marks on the cable, in accordance with the present invention.

In the past, suitable corrections have been made to the depth indications provided by the shaft 19 by turning a suitable hand crank 23 so as to add a mechanical correction to the output shaft 24 by way of a hand crank 23 on the differential gear 21. To determine how much correction to make, a coil 25 is used to detect magnetic marks which were placed on the cable 12 prior to logging a given borehole. The magnetic marks were initially placed on the cable 12 at given increments of cable length with the cable under a given reference tension. This reference tension was selected to be about the average of the tension on the cable 12 which could be expected under actual operating conditions. The coil 25 then detects these preplaced magnetic marks and applies signals representative thereof to a suitable voltage sensitive detector 26 whose voltage level is placed high enough that stray magnetic noise on the cable would not give an erroneous indication of a magnetic reference mark. The detector 26 output pulse is then fed to an incremental footage indicator 27 for ringing a bell, flashing a light, or some other suitable means to indicate to the operator that a reference mark had been detected.

Since these magnetic marks were placed on the cable at given increments of cable length, the operator could turn the hand crank 23 to insure that the last one or two digits indicated by the mechanical counter 28 were the same each time a mark was detected. Thus, for example, if the magnetic marks were placed at 100-foot intervals and the tool was at a depth of 10,000-feet, for example, when the first mark was detected, then the last two digits registered by the counter 28 should be "00" each time a magnetic mark is detected. To correct for cable length changes due to tension, the operator would read the cable tension off of the tension device 29 and through the use of suitable correction charts, would turn the hand crank 23 the necessary amount to make a suitable correction for tension. It can be seen that this operation is fairly laborious and requires some of the operator's valuable time. Also, due to the human reaction time not being instantaneous, there is room for some error when using this method of depth correction.

As stated previously, the Gollwitzer Pat. No. 3,497,958 discloses a system which continuously and automatically provides accurate indications of depth of the measuring device in the borehole at all times. However, as previously stated, this Gollwitzer depth correction system is fairly complex. It is the purpose of the present invention to provide new and improved methods and apparatus for determining the depth of a tool in a borehole wherein relatively simple and inexpensive apparatus can be utilized. To further make the methods and apparatus of the present invention relatively inexpensive, the accurate depth determining apparatus of the present invention can be utilized to accurately mark or remark cables. By so doing, these accurately marked cables can then be used in conjunction with the magnetic mark detector system comprising elements 25, 26 and 27 apart from the computing apparatus of the present invention to provide accurate indications of cable movement, and thus of total cable length.

Before proceeding with the description of the computing apparatus of the present invention, it would first be desirable to discuss the equations which give the true depth of a tool in a borehole. The basic equation for the true cable length $L_t$ of a tool in a borehole can be expressed as:

$$L_t = L_m C - \int_0^L ET\,dL + \frac{ETL}{2} \quad (1)$$

where:

$L_m$ is the total elapsed cable length measured by the sheave wheel 13;

C is a calibration coefficient representative of the change in diameter of the sheave wheel 13 from a known diameter;

E is the elastic coefficient of stretch of the cable 12;

T is the tension measured by the tension measuring device 16;

$dL$ is an incremental change in cable length; and

L is the total elapsed length of the cable which desirably is $L_m C$, but could be either $L_m$ or $L_t$ without producing any significant error.

As stated previously, the stretch correction charts used in the prior art depth correction systems give cable stretch versus tension as referenced to a given reference tension. For reasons to be explained later, this reference tension is utilized in the computing system of the present invention for uniformity with the prior art stretch correction charts. Thus, referencing the tension T of Equation 1 to a reference tension $T_{ref}$, we have:

$$L_t = L_m C - \int_0^L E(T - T_{ref})\,dL + \frac{E(T - 2T_{ref})L}{2} \quad (2)$$

Since the term $ET_{ref}dL$ is a constant, this term can be factored out of the integral sign in Equation 2 to give the expression:

$$L_t = L_m(C + ET_{ref}) - \int_0^L ET\,dL + \frac{E(T - 2T_{ref})L}{2} \quad (3)$$

There is another factor affecting cable length accuracy which should be accounted for and that is the effect that tension has on the measurement accuracy of the sheave wheel. Increases in tension will tend to distort the cable as well as decrease the sheave wheel diameter. To account for this effect, the term $$\int_0^L kT\,dL$$

should be added to Equation 3. This can be taken care of by combining this new term with the integral term in Equation 3 and defining a new constant K such that:

$$K = E - k$$

Thus, Equation 3 can be rewritten as:

$$L_t = L_m(C + ET_{ref}) - \int_0^L KT\,dL + \frac{E(T - 2T_{ref})L}{2} \quad (5)$$

Rewriting Equation 5 in digital form:

$$L_t = L_m(C + ET_{ref}) - \sum_0^L KT\Delta L + \frac{E(T - 2T_{ref})L}{2} \quad (6)$$

Now returning to FIG. 1 to explain how Equation 6 is solved, a shaft 35 from the sheave wheel 13 as well as the tension measurement signal from the tension device 16 are supplied to a computer 30. In the computer 30, the shaft 35 causes a suitable depth pulse generator 36 to generate depth pulses at given increments of cable travel. This depth pulse generator 36 can take the form of, for example, an optical slotted drum of the type shown in the copending Gollwitzer application. The depth pulse generator 36 desirably has two tracks or channels of slots designated channel A and channel B with the channel A slots being 90° out-of-phase with the channel B slots so that the direction of cable travel can be determined. The channel A and B output pulses from generator 36 are shaped by a suitable shaping circuit 37, such as a Schmitt trigger, and individually applied to a direction sensing and antijitter circuit 38. The circuit 38 determines the direction of cable travel, (i.e., up or down) and generates an output signal on either the "up" or "down" output lead representative thereof. The circuit 38 also generates a pulse every ¼-inch of cable travel. These ¼-inch cable travel pulses are designated $\Delta L_m$ and are supplied to a computing circuit 39 which solves the expression $(C+ET_{ref})\Delta L_m$ and generates corrected cable travel signals $\Delta L_{mc}$ at ½-inch and 1-inch intervals, designated $\Delta L_{mc-1/2''}$ and $\Delta L_{mc-1''}$ respectively.

To select the amount of correction in accordance with the term $C+ET_{ref}$, the operator merely determines how many ¼-inch pulses should be added to or inhibited from every 10,000 ¼-inch $\Delta L_m$ pulses (or identically, how many feet correction per 10,000 ft.). (Note: C and E are constants of the sheave wheel and cable respectively and can be different for different sheave wheels and cables.) The computing circuit 39 operates to add or inhibit a ¼-inch pulse for every 100 $\Delta L_m$ pulses being received from the direction sensing and antijitter circuit 38 up to a selectable maximum set by a pair of dials 40 and 41. The dials 40 and 41 are divided in increments of 10 and have multiplication factors of 100 and 1000 respectively.

At the end of 10,000 ¼-inch pulses, the computing circuit 39 is reset to again begin generating ¼-inch correction pulses every 100 ¼-inch $\Delta L_m$ up to the selectable maximum. To select the sign of the connection pulses in accordance with the sign of $C+ET_{ref}$, a switch 42 is set to either the + or − position. The computing circuit 39 also divides down the ¼-inch corrected $\Delta L_m$ pulses to generate ½-inch $\Delta L_m$ corrected pulses designated $\Delta L_{mc-1/2''}$ and a corrected 1-inch $\Delta L_m$ square wave signal, designated $\Delta L_{mc-1''}$.

To account for the $$\sum_0^L KT\Delta L$$

term of Equation 6, the tension T measured by the tension measuring device 16 is applied to the input of a multiplying circuit 43 which multiplies the measured tension T times the constant K. The multiplying circuit 43 accomplishes this by applying the measured tension signal to the input of an operational amplifier 44. One input to the operational amplifier 44 is grounded and the other input passes through a suitable resistor of value $R_1$. A feedback resistor of value $R_2$ is tapped at a plurality of points by a multiposition switch 45 whose wiper arm is connected to the output of the operational amplifier 44. Since the gain of such a circuit is proportional to the ratio of the feedback resistance $R_2$ to the input resistance $R_1$, the K factor can be selected by suitably positioning the switch 45 to adjust the circuit gain. The analog output signal from amplifier 44 is thus proportional to TXK. This TXK signal is supplied to the input of an analog-to-digital converter 46 which is commanded to digitize by the $\Delta L_{mc-1''}$ square wave signal from the computing circuit 39. Analog-to-digital converter 46 desirably takes the form of the common "ramp type" A/D converter.

The digital output signal from analog-to-digital converter 46 is thus proportional to TKΔL with TXK being derived from the multiplying circuit 43 and ΔL being the digitizing signal $\Delta L_{mc-1''}$. The pulses from the A/D converter 46 are counted by a suitable counter 47 of fixed capacity which generates an output pulse and automatically resets itself whenever the fixed capacity has been attained. This fixed capacity counter 47 is set such that an output correction pulse will be generated whenever ½-inch of correction is necessary in accordance with the term $$\sum_0^L KT\Delta L$$

Both the correction pulses from counter 47 and the $\Delta L_{mc-1/2''}$ pulses from computing circuit 39 are applied to a correction circuit 48 in which the correction pulses from counter 47 are utilized to always inhibit selected ones of the corrected cable length pulses $\Delta L_{mc-1/2''}$ from computer 39.

The reason why the counter 47 output pulses are always used to inhibit the $\Delta L_{mc-1/2''}$ pulses can be seen by observing that the term ΔL in Equation 6 will be positive when the tool is being lowered through the borehole so as to reduce the value of $L_t$. Since each $\Delta L_m$ pulse signifies a lower depth when the tool is being lowered, it is clear that a $\Delta L_m$ pulse should be inhibited in this case. On the other hand, when the tool is being raised through the borehole, ΔL is negative and the summation term of Equation 6 is positive thus making the true cable length $L_t$ greater. Since, while the tool is being raised, each $\Delta L_m$ pulse corresponds to a decrease in $L_t$, it is clear that one of these pulses should be inhibited when the summation term of Equation 6 indicates that a correction is to be made.

In accordance with one form of the present invention, the computing apparatus of FIG. 1 measures cable length changes in accordance with the first two terms of Equation 6, the last term thereof being mentally determined from time to time by the operator through the use of suitable cable stretch correction charts. Thus, that portion of the computing apparatus of FIG. 1 described thus far will operate to solve the equation:

$$\Delta L_0 = \Delta L_m(C+ET_{ref}) - \sum_0^{\Delta L} KT\Delta L \qquad (7)$$

which, when $\Delta L_0$ is accumulated, can be expressed as:

$$L_0 = L_m(C+ET_{ref}) - \sum_0^L KT\Delta L \qquad (8)$$

where $L_0$ is equal to $L_t$ minus the last term of Equation 6. The correction circuit 48 generates a train of pulses $\Delta L_0$ which are representative of the changes in cable length as computed in accordance with Equation 7 which $\Delta L_0$ pulses are selected by a switch 49 for application to a mechanical counter 50 and a fixed capacity bidirectional counter 51. The mechanical counter 50 accumulates the $\Delta L_0$ pulses so as to indicate the total elapsed cable length in accordance with Equation 8.

The "up" and "down" direction outputs from the direction sensing and antijitter circuit 38 are applied to the steering inputs of the bidirectional counter 51 to instruct counter 51 whether to count up or down. After the bidirectional counter 51 reaches its predetermined count, e.g., a count corresponding to 100-feet, a pulse is generated therefrom and the counter is reset. This pulse output from counter 51, and computer 30, can be utilized to energize the incremental footage indicator 27 if a switch 52 is closed. Additionally, if a switch 56 is closed, the counter 51 output pulse could energize a suitable cable marking device comprising an amplifier 53 and horseshoe shaped magnetic bar 54 having a coil 55 wound therearound. A magnetic mark will then be placed on the cable at given intervals of cable travel as determined by the count capacity of counter 51, in this example, every 100-feet. An erase coil 57 energized by an oscillator 58 by way of a switch 59 is located on the borehole side of the cable marking device.

Now concerning the operation of this portion of the FIG. 1 apparatus described thus far, the computer 30 is responsive to the tension T measured by the tension device 16 and the incremental cable travel $\Delta L_m$ as measured by the sheave wheel 13 and supplied to the computer 30 by the mechanical shaft 35 for producing a train of output pulses $\Delta L_0$ which, when accumulated by the counter 50, with switch 49 in the $\Delta L_0$ position, corresponds to Equation 8. The bidirectional counter 51 counts the ½-inch $\Delta L_0$ pulses from the correction circuit 48 and generates an output pulse every 100-feet of cable travel.

When the tool 10 is being lowered through the borehole 11, the shaft 19 causes the mechanical counter 28 of the recorder 20 to indicate the length of cable that is being paid out at the surface of the earth. With the switches 56, 59 and 26a opened, and switch 52 closed, the computer 30 will energize the incremental footage indicator 27 every 100-feet of cable travel. The operator checks the number registered by the counter 28 each time an indication from indicator 27 is received and if the last two digits therein are not the same each time, the operator will turn the hand crank 23 the necessary amount to make them the same. This operation continues until the tool is at the point in the borehole where it is desired to begin the logging operation. Then, with the tool moving up at a suitable logging speed, the operator reads the tension off of the tension gauge 29 and through the use of the stretch correction charts, turns the hand crank 23 to make the necessary adjustment. These stretch correction charts, in effect, correspond to the last term of Equation 6. At this point, then the depth indicated by the counter 28 is in effect the true cable length $L_t$.

Next, the operator causes the cable to be reeled in, thus moving the tool 10 up the borehole. The same adjustment operation just described also takes place as the tool is being moved up the borehole. That is, every time the indicator 27 indicates that 100-feet of cable has been reeled in, the hand crank 23 is rotated the necessary amount so that the last two digits registered in counter 28 will be the same each time an indication is received. Since the last term of Equation 6 can change the overall cable length $L_t$ as the cable is reeled in, it is desirable for the operator to periodically utilize the stretch correction charts to make the necessary adjustment in the depth registered by counter 28. It would be desirable that this stretch correction be made somewhat frequently so that only small changes in depth will be cranked into the recorder 20 from time to time rather than infrequent large changes. It should be mentioned that whenever this correction from the stretch charts is added in by the hand crank 23, the last two digits registered by the counter 28 will also change thus altering synchronism with the incremental footage indicator 27. Thus, for example, after one foot of correction from the stretch chart has been made, the last digit registered by counter 28 would also change by 1-foot whenever an indication is received from the incremental footage indicator 27.

Thus, it can be seen that by utilizing the methods and apparatus of the present invention, a relatively accurate running tabulation of the depth of the tool 10 in the borehole can be made with relatively simple and inexpensive equipment. Thus, the computer 30 when computing $\Delta L_0$ in accordance with Equation 7 will automatically account for those portions of Equation 6 which require relatively frequent corrections to be made to the cable movement $\Delta L_m$. The last term of Equation 6, which requires only relatively infrequent corrections to be made to $\Delta L_m$, can be accomplished by hand.

To make depth control even more inexpensive, switches 56, 59 can be closed (and switch 26a opened) while the cable is being reeled in so as to accurately mark or remark the cable. Thus, coil 57 will erase any magnetic marks already on the cable and the horseshoe shaped magnetic bar 54 will cause the cable to be remarked whenever the coil 55 is energized. By so doing, the cable 12 will have accurate reference marks thereon and can thus be used apart from the computer 30 for relatively accurate depth control. In this event, the accurate magnetic marks on the cable 12 can be utilized to energize the detector 26 and the incremental footage indicator 27 in place of the pulses generated from the bidirectional counter 51. This, in effect, means that the computer 30 need not be located in every logging truck.

Figure 2A:
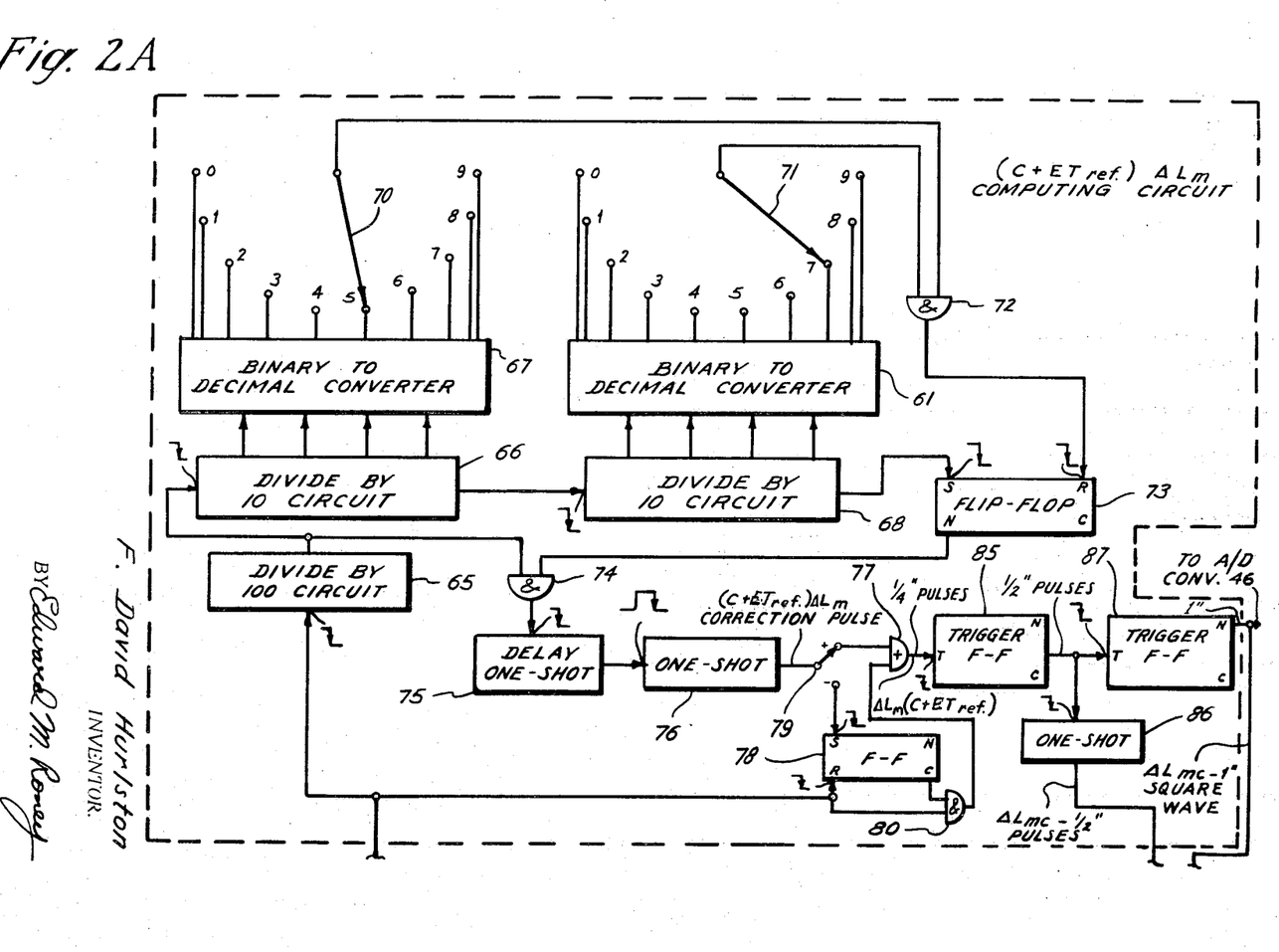
FIGS. 2A and 2B show certain components of the FIG. 1 system in greater detail.
Figure 2B:
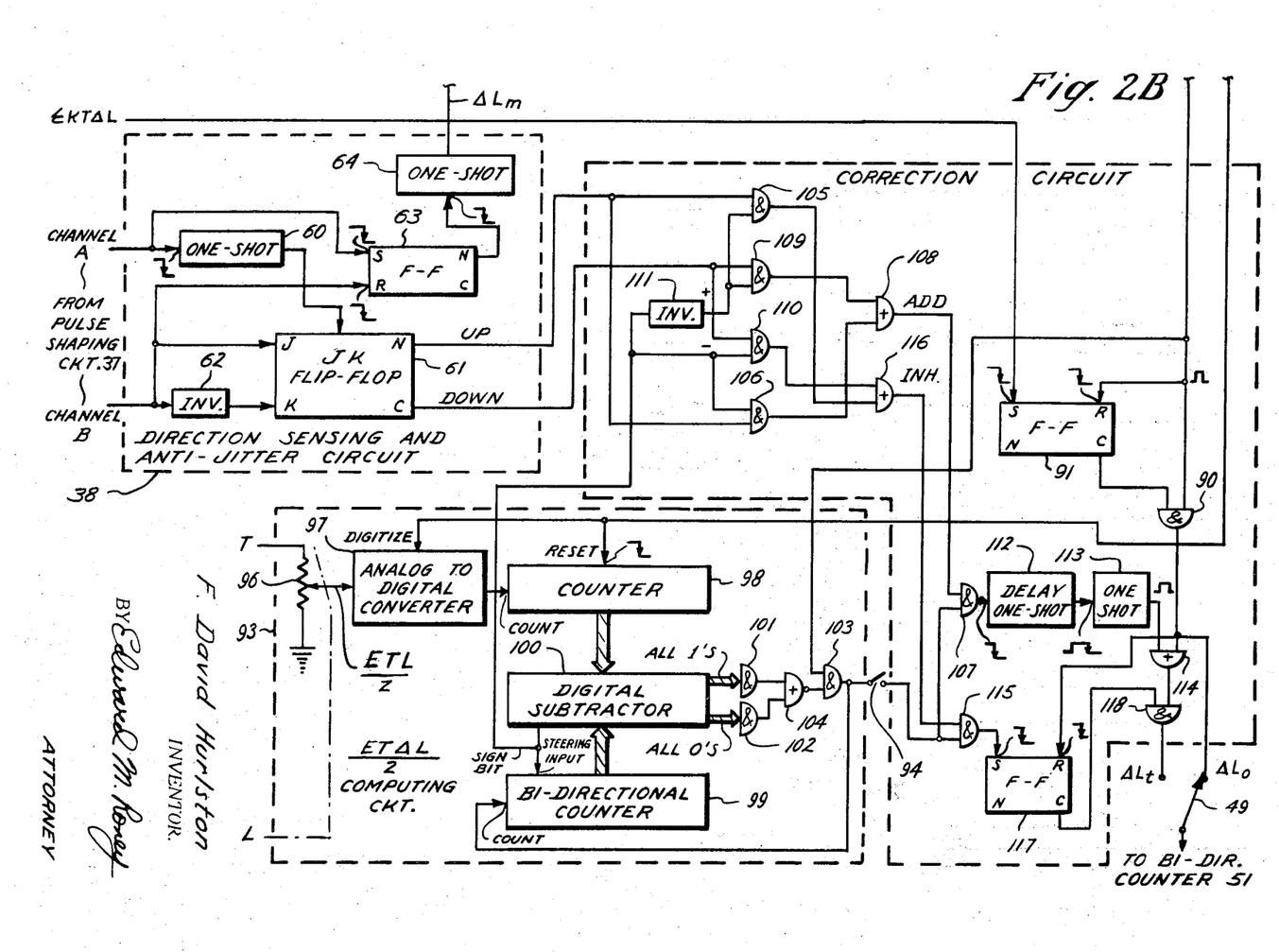
Figure 3A:
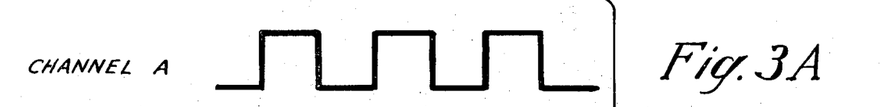
FIGS. 3A–3E, 4A–4E, 5A–5G and 6A–6K illustrate voltage timing diagrams useful in explaining the operation of the FIGS. 1 and 2 apparatus.
Figure 3B:
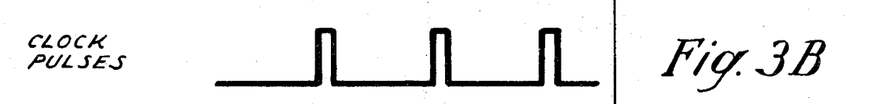
Figure 3C:
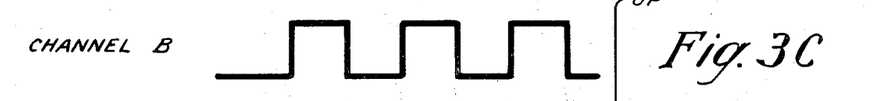
Figure 3D:
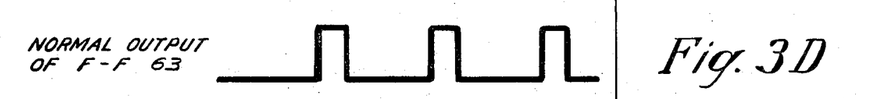
Figure 3E:
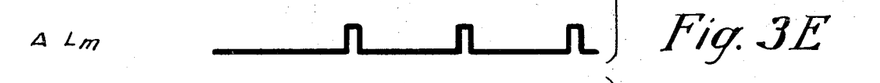

Now referring to FIGS. 2A, 2B, and 3A–3E in conjunction, FIGS. 2A and 2B show portions of the computer 30 of FIG. 1 in greater detail and FIGS. 3A–3E illustrate voltage timing waveforms useful in explaining the operation of a portion of the FIGS. 2A and 2B apparatus. (To make one complete view of FIG. 2, FIGS. 2A and 2B should be laid horizontally with FIG. 2A above FIG. 2B. From this point on, FIGS. 2A and/or 2B will be referred to simply as FIG. 2.) In FIG. 2, first referring to the direction sensing and antijitter circuit 38, the channel A and channel B pulses from the shaping circuit 37 are applied to the input of circuit 38, as discussed in FIG. 1. The falling edge of the channel A pulses, shown in FIG. 3A, energize a one-shot 60 which in turn generates clock pulses, shown in FIG. 3B, which act to clock a J–K flip-flop 61. The channel B pulses, shown in FIG. 3C, are applied in normal and complementary fashion to the J and K inputs of the J–K flip-flop 61 respectively. The complementary function is derived from an inverter 62.

The state of the J–K flip-flop 61 is indicative of the direction of cable travel, the normal output thereof indicating that the cable is moving up and the complementary state indicating that the cable is moving down. Remembering that the channel A drum slots are 90° out-of-phase with the channel B slots, the channel B pulse will be of one polarity on the falling edge of the channel A pulse when the cable is moving in one direction and of the opposite polarity when moving in the other direction thus placing the J–K flip-flop 61 in the proper state.

Figure 4A:
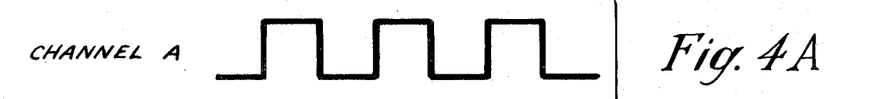
Figure 4B:
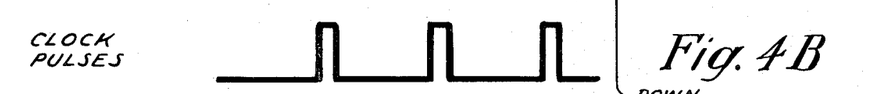
Figure 4C:
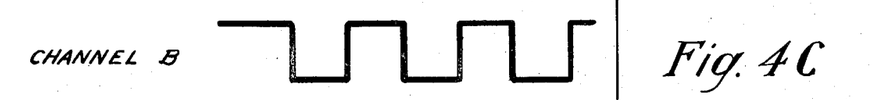

To better understand this operation, specific examples of both the up and down direction of travel will be given. Thus, referring to FIGS. 3A–3E, there is shown an example of the cable moving up the borehole. It can be seen that the clock pulses of FIG. 3B, which are generated in response to the falling edge of the channel A pulses of FIG. 3A, are generated at the same time that the channel B pulses of FIG. 3C at the "1" level thus energizing the J input of the J–K flip-flop 61 each time it is clocked. Thus, the normal output of flip-flop 61 will always be at the "1" level whenever the cable is moving up the borehole. Now referring to FIGS. 4A–4C, there is shown the waveforms of the direction sensing circuit 38 when the cable is moving down the borehole. It can be seen that, in this case, the clock pulses of FIG. 4B, which again are generated in response to the falling edges of the channel A pulses of FIG. 4A, occur when the channel B pulses of FIG. 4C are at the "0" level. When the channel B pulses are at the "0" level, the output of inverter 62 will be at the "1" level thus switching the J–K flip-flop 61 to its complementary state to indicate a down direction of cable travel.

Figure 4D:
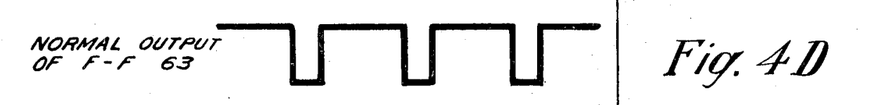
Figure 4E:
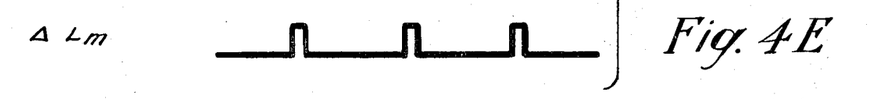

To generate the $\Delta L_m$ pulses, the falling edge of the channel A pulses set a bistable multivibrator or flip-flop 63 which is reset by the falling edge of the channel B pulses. The falling edge of the normal output (see FIGS. 3D and 4D) of flip-flop 63 triggers a one-shot 64 to generate a $\Delta L_m$ pulse, shown in FIGS. 3E and 4E. By this arrangement, there must be two successive falling edges, one each from the channel A and channel B pulses, before a $\Delta L_m$ pulse can be generated. This prevents a small jitter in the slotted rum of the depth pulse generator 36 of FIG. 1 from generating erroneous $\Delta L_m$ pulses.

Figure 5A:
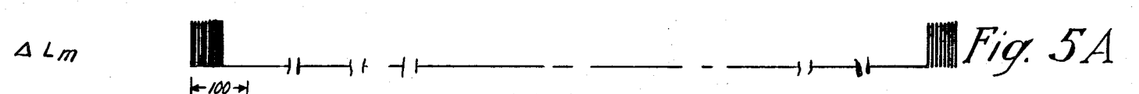

Now concerning the $(C+ET_{ref})\Delta L_m$ pulse generating circuit 39 in greater detail and referring to FIGS. 2 and 5A–5G in conjunction, the $\Delta L_m$ pulses, represented in FIG. 5A, are supplied to a divide-by-100 counting circuit 65. The counter 65 is triggered on the falling edge of the FIG. 5A $\Delta L_m$ pulses and generates the output waveform of FIG. 5B which has a falling edge every 100 $\Delta L_m$ pulses. This output signal is supplied to an AND gate 74. This divide-by-100 circuit 65 could take the form of, for example, a binary counter with suitable feedback connections to produce the waveform of FIG. 5B, as is well known in the electronics art. The trailing edge of the output waveform from the divide-by-100 circuit 65 triggers a divide-by-10 circuit 66, which likewise could comprise a binary counter with suitable feedback connections. A binary-to-decimal converter 67 is responsive to the outputs of the four counter stages of circuit 66 so as to produce an output signal on one of the 0–9 output leads thereof in response to the state of the divide-by-10 circuit 66.

Figure 5B:
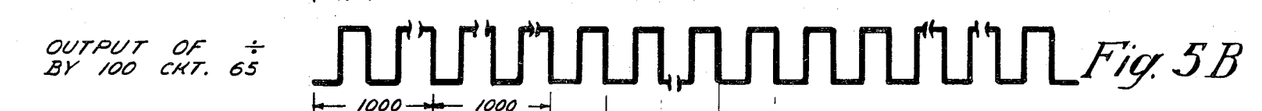
Figure 5C:
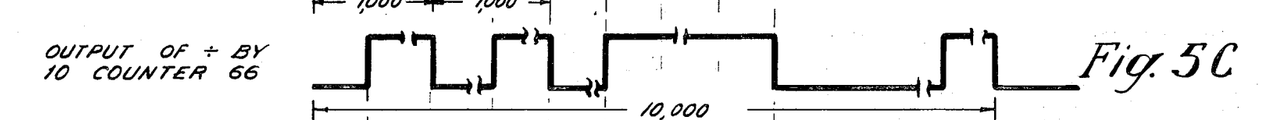
Figure 5D:
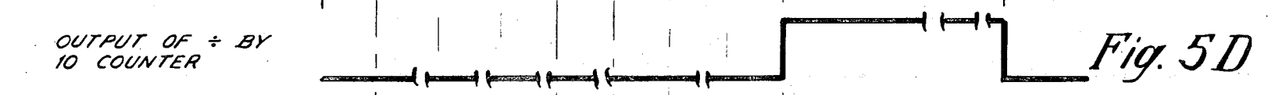
Figure 5E:
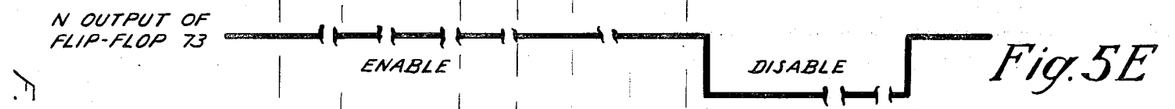

Another output of the divide-by-10 circuit 66, whose waveform is shown in FIG. 5C, is supplied to the count input of a divide-by-10 circuit 68 which is energized on the falling edge of the applied input pulses. This circuit 68 could likewise comprise a binary counter with suitable feedback connections. The falling edge of the output from the last stage of the divide-by-10 circuit 68, which falling edge occurs on every 10th applied input to circuit 68, as shown in FIG. 5D, sets a flip-flop 73. The normal output from flip-flop 68, shown in FIG. 5E, enables the AND gate 74 to pass the FIG. 5B output signal from the divide-by-100 circuit 65. The various stages of the divide-by-10 circuit 68 are supplied to a binary decimal converter 69 which likewise has ten output leads designated 0–9. The dials 40 and 41 of FIG. 1, shown as switches in FIG. 2, are utilized to select one of the 0–9 output leads from each of the converters 67 and 69 respectively and connect these selected output leads to the inputs of an AND gate 72. The falling edge of the output pulse from AND gate 72 resets the flip-flop 73.

Looking at FIGS. 5A, 5B, 5C and 5D in conjunction, it can be seen that the output of the divide-by-100 circuit 65 will produce a falling edge every 100 $\Delta L_m$ pulses and the output of the divide-by-10 circuit 66 will produce a falling edge every 1000 $\Delta L_m$ pulses. The output of the divide-by-10 counter, shown in FIG. 5D, will produce a falling edge every 10,000 $\Delta L_m$ pulses.

As long as the flip-flop 73 is in its normal or set state, the AND gate 74 is enabled to pass the FIG. 5B output pulses from the divide-by-100 circuit 65 to a delay one-shot 75 which is triggered on the pulse falling edges. The falling, and thus, trailing edge of the resulting positive going output pulse from the delay one-shot 75 triggers a one-shot 76 which generates a correction pulse, shown in FIG. 5F, to either the input of an OR gate 77 or the set input of a flip-flop 78 depending on whether a switch 79 is in the + (add) or − (inhibit) position. The $\Delta L_m$ pulses are also applied to an input of the OR gate 77 by way of an AND gate 78 which is enabled by the complementary output of the flip-flop 78. The falling edges of the $\Delta L_m$ pulses reset the flip-flop 78.

Thus, in operation, if switch 79 is in the + position, the flip-flop 78 will remain reset and every $\Delta L_m$ pulse will be applied to the OR gate 77 as will the correction pulses from one-shot 76. The delay introduced by delay one-shot 75 insures that the correction pulses will not be generated at the same time as the $\Delta L_m$ pulses. (Recall that both of the dividing circuits 65 and 66 are advanced in response to the falling edges of the $\Delta L_m$ pulses.)

Now, on the other hand, if the switch 79 is in the − (inhibit) position, every time a correction pulse is generated from one-shot 76, flip-flop 78 will be set to thus disable the AND gate 80 from passing the next $\Delta L_m$ pulse to the OR gate 77. The trailing edge of this same $\Delta L_m$ pulse will then reset the flip-flop 78 so as to again enable the AND gate 80 to be in readiness for the next $\Delta L_m$ pulse. It should be noted that the flip-flop 78 has, by design or otherwise, a sufficient delay that the AND gate 80 will not be enabled until after the $\Delta L_m$ pulse which resets flip-flop 78 has been inhibited.

Now summarizing the operation of the pulse generating circuit 39, and referring to FIGS. 5A–5G in conjunction with FIG. 2, the position of the switches 70 and 71 are set by the dials 40 and 41 of FIG. 1 in accordance with the value of the constant $C+ET_{ref}$ so that the flip-flop 73 will be reset after a suitable number of $\Delta L_m$ pulses have been counted. In the meantime, the flip-flop 73 will be enabling the AND gate 74 to energize the delay one-shot 75 and one-shot 76 after each 100 $\Delta L_m$ pulses so as to make a suitable correction to the $\Delta L_m$ pulse train from the correction sensing and antijitter circuit 38. A correction pulse will then be generated after each 100 $\Delta L_m$ pulses until flip-flop 73 is reset. Then, at the end of 10,000 $\Delta L_m$ pulses, the flip-flop 73 is again set to begin the operation again.

Figure 5F:
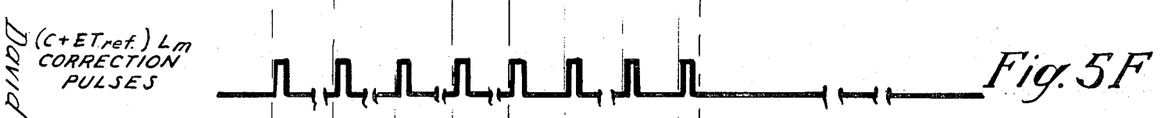
Figure 5G:
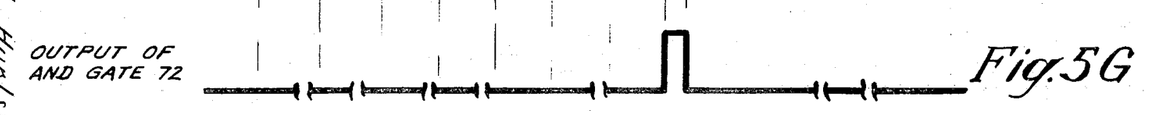

This can better be seen by comparing the divide-by-100 circuit 65 output waveform of FIG. 5B with the correction pulse waveform of FIG. 5F where it is shown that a correction pulse will be generated every 100 $\Delta L_m$ pulses. Now looking at FIG. 5G, there is shown the output waveform from the AND gate 72 whose trailing edge resets the flip-flop 73 to thus disable it, as seen by comparing FIGS. 5F and 5G. As seen by comparing the divide-by-10 circuit 68 output waveform of FIG. 5D with the flip-flop 73 output waveform of FIG. 5E, the flip-flop 73 is again set after 10,000 $\Delta L_m$ pulses to thus enable the correction pulses to again be generated.

Figure 6A:
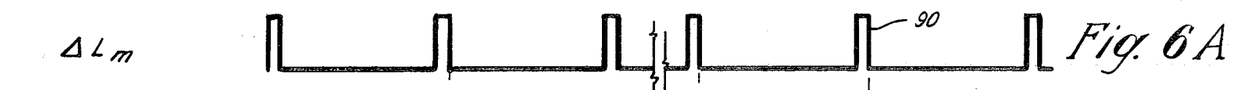
Figure 6B:
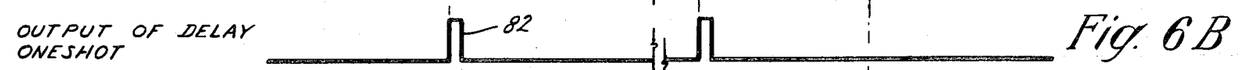
Figure 6C:
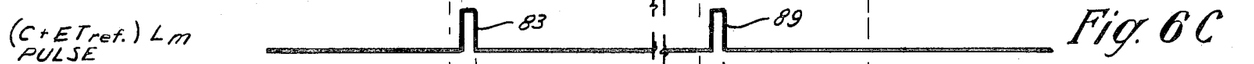
Figures 6D, 6E:
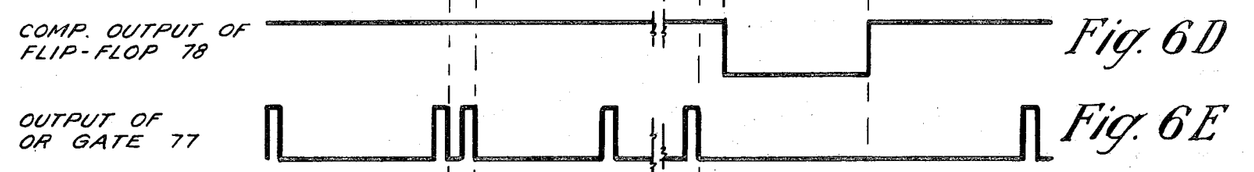
Figure 6F:
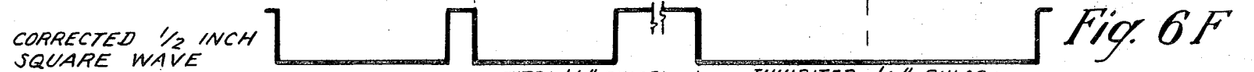
Figures 6G, 6H:
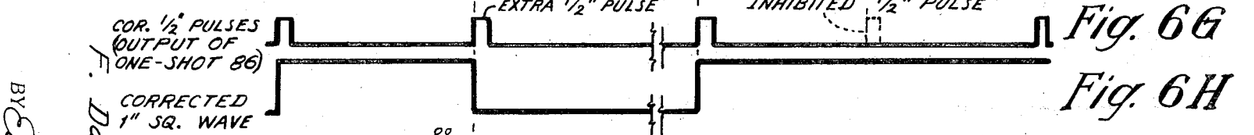

To understand how the $\Delta L_m$ pulses are corrected, refer to FIGS. 6A–6G in conjunction with FIG. 2. That portion of the voltage waveform diagram of FIG. 6 to the left of the break line represents the case where a correction pulse is added to the $\Delta L_m$ pulse train and that portion to the right of the break line represents the operation when a $\Delta L_m$ pulse is inhibited. First concerning the adding operation, the $\Delta L_m$ pulses are shown in FIG. 6A. Assuming that a correction is to be made, the pulse 82 from the output of delay one-shot 75, shown in FIG. 6B, will be generated to cause the $(C+ET_{ref})$ $\Delta L_m$ correction pulse 83 of FIG. 6C to be generated from the one-shot 76. Since for this case, the switch 79 is in the + or add position, the complementary output of flip-flop 78, shown in FIG. 6D, will always be at the "1" level so that AND gate 80 will always be enabled. Looking now at FIG. 6E, there is shown the output of the OR gate 77 which includes both the $\Delta L_m$ pulses of FIG. 6A and the correction pulses of FIG. 6E. The trailing edge of the resulting corrected ¼-inch $\Delta L_m$ pulses from OR gate 77 trigger a trigger flip-flop 85 whose normal output is shown in FIG. 6F to produce a corrected ½-inch $\Delta L_m$ square wave. The trailing edge of the normal output of trigger flip-flop 85 energizes a one-shot 86 so as to generate ½-inch corrected $\Delta L_m$ pulses shown in FIG. 6G. These are the $\Delta L_{mc-1/2''}$ pulses discussed in FIG. 1 which are applied to the input of the correction circuit 48.

Figure 6I:
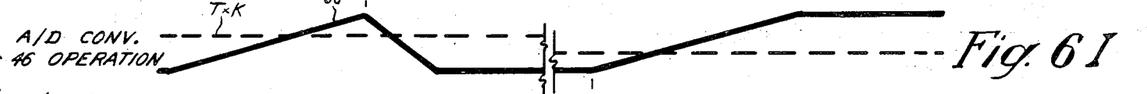
Figures 6J, 6K:
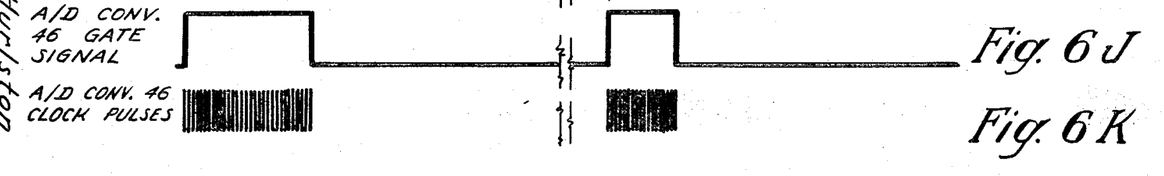

Before proceeding with the discussion of the correction circuit 48, it would perhaps be desirable to explain how the analog-to-digital converter 46 of FIG. 1 operates in response to the digitizing control signal from the computing circuit 39. The trailing edges of the corrected ½-inch square wave from the normal output of trigger flip-flop 85 trigger a flip-flop 87 which generates the corrected 1-inch square wave waveform shown in FIG. 6H. When this FIG. 6H square wave is at the "1" level, a ramp generator (not shown) in the analog-to-digital converter 46 generates the ramp signal 88 of FIG. 6I. The TXK signal from the TXK circuit 43 of FIG. 1 is also shown in dotted form in FIG. 6I. In the usual $A/D$ converter operation, a gate (not shown) is opened when the ramp signal 88 begins rising and is closed when this ramp signal reaches the level of the TXK signal so as to pass the clock pulses of FIG. 6K to the counter 47 of FIG. 1. Thus, the number of clock pulses counted by counter 47 will be proportional to the magnitude of the TXK signal.

Now concerning the inhibit operation shown to the right side of the break line in FIG. 6, a correction pulse 89, shown in FIG. 6C, will cause the complementary output of flip-flop 78 to go to the "0" level thus disabling the AND gate 80. The flip-flop 78 will remain reset until the trailing edge of the next $\Delta L_m$ pulse of FIG. 6A (pulse 90), as seen by comparing FIGS. 6A and 6D. Since the flip-flop 78 is not reset until the trailing edge of this next $\Delta L_m$ pulse 90 of FIG. 6A, the $\Delta L_m$ pulse 90 will be inhibited, as represented by the dotted line pulse of FIG. 6G. The flip-flop 78 is then reset on the trailing edge of this $\Delta L_m$ pulse 90 to allow the subsequent $\Delta L_m$ pulses to pass through AND gate 80 to OR gate 77. The resulting corrected 1-inch square wave shown in FIG. 6H will not change states then until the next ½-inch pulse after this inhibited pulse of FIG. 6G has passed through AND gate 80 and OR gate 77.

Now concerning the internal configuration of the correction circuit 48, the $\Delta L_{mc-1/2''}$ pulses from one-shot 86 are supplied to one input of AND gate 90 which is enabled by the complementary output of a flip-flop 91. The trailing edges of the $\Delta L_{mc-1/2''}$ pulses from one-shot 86 resets the flip-flop 91. The trailing edges of the $$\sum_{0}^{\Delta L} TXK\Delta L$$

correction pulses from the counter 47 set the flip-flop 91 so that the flip-flop 91 and AND gate 90 operate in essentially the same manner as the flip-flop 78 and AND gate 80 of the computing circuit 39. That is to say, the AND gate 90 will pass the $\Delta L_{mc-1/2''}$ pulses until the flip-flop 91 is set at which time one $\Delta L_{mc-1/2''}$ pulse will be inhibited, the trailing edge of the inhibited pulse resetting the flip-flop to enable the AND gate to pass the next ½-inch pulse.

The pulses $\Delta L_{mc-1/2''}$ from one-shot 86 of the computing circuit 39 are representative of the function $(C+ET_{ref})\Delta L_m$ and the pulses from the counter 47 of FIG. 1 are representative of the function.

$$\sum_{0}^{\Delta L} KT\Delta L$$

Thus, the output pulses from AND gate 90 are representative of $$(C+ET_{ref})\Delta L_m - \sum_{0}^{\Delta L} KT\Delta L$$

which, in accordance with Equation 7 corresponds to the $\Delta L_o$ pulses. These $\Delta L_o$ pulses are applied by way of the switch 49 to the bidirectional counter 51 and mechanical counter 50 of FIG. 1 for the purposes described earlier in connection with FIG. 1. The $\Delta L_o$ pulses when accumulated, give $L_o$ in accordance with Equation 7.

Instead of using the stretch correction charts to provide the last term of Equation 6 as discussed earlier, it would be possible to automatically compute this function. Looking at Equation 6, it can be seen that the factor $ET_{ref}L$ can be factored from the last term of Equation 6 and subtracted from the first term thereof to provide the expression:

$$L_t = L_m C - \sum_{0}^{L} KT\Delta L + \frac{ETL}{2} \quad (9)$$

To solve Equation 9 then, referring to FIG. 1, the dials 40, 41 and 42 will be placed in the proper positions to solve the first term of Equation 9 in the same manner as before. Likewise, the middle term of Equation 9 will be taken into account by the circuits 43, 46 and 47. To solve the last term of Equation 9, a computing circuit 93 is responsive to the tension T measured by the tension measuring device 16, a mechanical shaft 95 from the counter 50, and the corrected ½-inch pulses $\Delta L_{mc-1/2''}$ and 1-inch square wave signal from the computing circuit 39 for determining the necessary correction in accordance with the term $ETL/2$. The computing circuit 93 then generates a correction pulse whenever a correction of ½-inch is necessary. This correction pulse is supplied to the correction circuit 48 by way of a switch 94, the switch 94 allowing the operator to select either the manual (stretch chart computation) or automatic mode of operation for this function $ETL/2$.

Now referring to FIG. 2, there is shown in more detail apparatus for correcting the $\Delta L_m$ pulses in accordance with the function $ETL/2$. The tension measurements from the tension measuring device 16 are supplied across the resistance portion of a potentiometer 96 whose wiper arm is moved as a function of cable length by the shaft 95 from the counter 50 so that the position of this wiper arm will always be proportional to true cable length $L_t$. The electrical signal picked up by the wiper arm of potentiometer 96 is supplied to the input of an analog-to-digital converter 97 which is instructed to digitize by the 1-inch square wave signal from the flip-flop 87 of the computing circuit 39. The analog-to-digital converter 97 performs its digitizing operation in the same manner as the analog-to-digital converter 46 of FIG. 1 and thus need not be discussed further.

The pulses from the analog-to-digital converter 97 are counted by a binary counter 98. The number stored in the counter 98 is compared with the digital number stored in a bidirectional counter 99 by a digital subtractor 100. In accordance with standard binary arithmetic, when the number stored in the counter 98 is equal to the number stored in the counter 99, all of the stages of the subtractor 100 will either be "1" or "0." This condition is monitored by a pair of AND gates 101 and 102 which act to enable an AND gate 103 by way of a NOR gate 104 when either of these conditions exist, i.e., when the two compared digital signals are unequal. When enabled, the AND gate 103 passes the $\Delta L_{mc-1/2''}$ pulses from the one-shot 86 of the computing circuit 39 to the correction circuit 48 and to the count input of the bidirectional counter 99. The sign bit derived from the sign stage of the digital subtractor 100 instructs the bidirectional counter 99 whether to count up or down.

Now concerning the operation of this $ET\Delta L/2$ computing circuit 93, the analog signal proportional to $ETL/2$ is digitized by the analog-to-digital converter 97 and stored in the counter 98. This number stored in counter 98 is compared with the number stored in counter 99 and a bit is either added or subtracted from the counter 99 if the two numbers are unequal. The sign bit stage of the subtractor 100 determines whether the counter 99 should count up or down to make the two numbers equal. Each time a correction is made to the bidirectional counter 99, a suitable correction is made to the $\Delta L_o$ pulses in the corrector 48, to be described later. It can thus be seen that the instantaneous value of $ETL/2$ is periodically stored in the counter 98 which then interrogates the bidirectional counter 99 by way of the subtractor 100 to determine if a correction should be made to the counter 99. Since each correction made to the counter 99 indicates a change in cable length, the same correction is made in the correction circuit 48 to the $\Delta L_{mc-1/2''}$ pulses so that the total number of accumulated pulses will reflect the true cable length $L_t$. In other words, a ½-inch correction $\Delta L$ pulse is generated from the $ET\Delta L/2$, computing circuit 93 whenever this circuit indicates a correction is necessary.

Now referring to the correction circuit 48 of FIG. 2, to determine whether the above-described correction pulse from the $ET\Delta L/2$ computing circuit should be added or subtracted from the $\Delta L_{mc-1/2''}$ pulse, the sign bit from the digital subtractor 100 is combined in suitable logic circuitry with the up and down cable travel direction signals from the direction sensing and antijitter circuit 38. This logic circuitry is arranged so that a $\Delta L_{mc-1/2''}$ pulse will be inhibited when the cable travel is up and the sign bit is positive or when the cable travel is down and the sign bit is negative. On the other hand, a correction pulse will be added to the $\Delta L_{mc-1/2}$ pulse train when the cable travel is up and the sign bit is negative or when the cable travel is down and the sign bit is positive.

To accomplish this, the "up" direction signal from the direction sensing and antijitter circuit 38 is supplied to the inputs of AND gates 105 and 106 and the down signal is supplied to the inputs of AND gates 109 and 110. The signal bit signal from the digital subtractor 100 is supplied to the inputs of AND gates 106 and 110 such that these AND gates will be enabled when the sign bit is "1" ("1" equals negative). The sign bit is inverted by an inverter 111 to enable the AND gates 105 and 109 when the sign bit is "0" or positive. To add a correction pulse, the output of AND gates 106 and 109 are utilized to enable an AND gate 107 by way of an OR gate 108 so that the AND gate 107 will pass the correction pulses from the AND gate 103 of the $ET\Delta L/2$ computing circuit 93. The trailing edge of the output pulse from AND gate 107 energizes a delay one-shot 112, the trailing edge of whose output pulse energizes a one-shot 113. The output pulse from one-shot 113 is then combined by an OR gate 114 with the $\Delta L_o$ pulses from the AND gate 90.

To inhibit a pulse, on the other hand, the outputs of AND gates 105 and 110 are combined in an OR gate 116 to enable an AND gate 115 to pass the correction pulses from the AND gate 103 of the $ET\Delta L/2$ computing circuit 93. The trailing edge of the output correction pulse from AND gate 115 acts to set a flip-flop 117 whose complementary output enables an AND gate 118 to pass the output pulses from OR gate 114 to the $\Delta L_t$ contact of the switch 91. Flip-flop 117 is then reset by the trailing edge of the $\Delta L_o$ pulses from AND gate 93.

Concerning the operation of this portion of the correction circuit 48 just discussed, the logic circuitry comprising AND gate 105, 106, 109, 110, inverter 111 and OR gates 108 and 116 operate to determine whether a pulse should be added to or inhibited from the $\Delta L_o$ pulse train from the AND gate 90. If a pulse is to be added thereto, the AND gate 107 is enabled to pass the correction pulse from AND gate 103 to the OR gate 114 to be added to the $\Delta L_o$ pulse train. The delay one-shot 112 and one-shot 113 perform the same function as the delay one-shot 75 and one-shot 76 of the computing circuit 39, that is, to insure that the correction pulse does not overlap with one of the $\Delta L_o$ pulses. If a pulse is to be inhibited from the $\Delta L_o$ pulse train, the flip-flop 117 will disable the AND gate 118 to inhibit the pulse from passing through with the trailing edge of the inhibited pulse resetting the flip-flop 117 so that the very next pulse will pass through. This operation is essentially the same as that described in connection with the flip-flop 78 and AND gate 80 of the computing circuit 39 of FIG. 2.

It can thus be seen that the output of AND gate 118 combines the function $ET\Delta L/2$ to $\Delta L_o$ to give $\Delta L_t$. When these $\Delta L_t$ pulses are accumulated by counter 50 of FIG. 1, the accumulated count therein will give $L_t$ in accordance with Equation 9. Thus by utilizing the $ET\Delta L/2$ computing circuit 93, i.e., by closing the switch 94 and moving the switch 91 to the $\Delta L_t$ position, all of the computation of true cable length can be taken care of automatically without any need for manual calculations by the operator. If desired, the recorder 20 of FIG. 1 could be automaticallly driven by the output shaft 95 from counter 50 without the necessity of utilizing the previously discussed manual correction procedure involving hand crank 23.

While there has been described what is at present considered to be a preferred embodiment of this invention, it will be obvious to those skilled in the art that various changes and modifications may be made therein without departing from the invention, and it is, therefore, intended to cover all such changes atnd modifications as fall within the true spirit and scope of the invention.

What is claimed is:

1. Apparatus for placing reference marks on a cable lowered in a borehole, comprising:
   (a) means responsive to movement of a cable at the surface of the earth for generating a first electrical signal representative of cable movement;
   (b) means for generating a second electrical signal repreesntative of a cable length correction function;
   (c) means for electrically combining said first and second electrical signals to produce a third signal which is more accurately representative of cable movement;
   (d) means for electrically accumulating representations of said third signal; and
   (e) means responsive to said accumulated third signal for placing reference marks at locations along the length of a cable determined by given accumulations of said third signal representations.

2. Apparatus for placing reference marks on a cable lowered in a borehole, comprising:
   (a) means responsive to movement of a cable at the surface of the earth for generating a series of pulses representative of cable movement, each pulse being representative of a given increment of cable movement;
   (b) means for generating a signal representative of a cable length correction function;
   (c) means responsive to said signal for correcting said series of pulses to produce a corrected series of pulses which are more accurately representative of cable movement;
   (d) means for counting said corrected series of pulses and generating an output signal upon a predetermined number of pulses being counted; and
   (e) means responsive to said output signal for placing a reference mark on a cable.

3. The apparatus of claim 1 wherein said means for generating a second electrical signal includes tension measuring means for measuring the tension in the cable at the surface of the earth and generating said second signal, which second signal is representative of the measured tension.

4. Apparatus for placing reference marks on a cable lowered in a borehole, comprising:
   (a) means responsive to movement of a cable at the surface of the earth for generating a series of pulses representative of cable movement, each pulse being representative of a given increment of cable movement;
   (b) means for measuring the tension in a cable;
   (c) means responsive to said measured tension for correcting said series of pulses to produce a corrected series of pulses which are more accurately representative of cable movement;
   (d) means for counting said corrected pulses and generating an output signal upon a predetermined number of pulses being counted; and
   (e) means responsive to said output signal for placing a reference mark on a cable.

5. Apparatus for placing reference marks on a cable lowered in a borehole, comprising:
   (a) means responsive to movement of a cable at the surface of the earth for generating a series of pulses representative of cable movement;
   (b) means responsive to cable movement for generating a correction pulse representative of a cable length correction function at selected intervals of cable movement;
   (c) means responsive to said correction pulse for correcting said series of pulses to produce a corrected series of pulses which are more accurately representative of cable movement;

(d) means for counting said corrected series of pulses and generating an output signal upon a predetermined number of pulses being counted; and
(e) means responsive to said output signal for placing a reference mark on a cable.

6. Apparatus for placing reference marks on a cable lowered in a borehole, comprising:
(a) means responsive to movement of said cable at the surface of the earth for generating a series of pulses representative of cable movement;
(b) means for measuring the tension on a cable;
(c) means responsive to said measured tension for generating first pulses at given increments of cable movement;
(d) means for counting said first pulses and generating a tension correction pulse upon a predetermined number of said first pulses being counted;
(e) means for generating a calibration correction pulse at given increments of cable movement;
(f) means responsive to said tension and calibration correction pulses for correcting said series of pulses to produce a corrected series of pulses;
(g) means for counting said corrected series of pulses and generating an output signal upon a predetermined number of said corrected series of pulses being counted; and
(h) means responsive to said output signal for placing a reference mark on a cable.

7. Apparatus for determining the change in position of a tool supported by a cable in a borehole, comprising:
(a) means for generating cable movement pulses representative of incremental movement of a cable and for generating correction pulses; and
(b) correction means responsive to said correction pulses for correcting said cable movement pulses, said correction means including bistable means adapted to be set by said correction pulses and reset by said cable movement pulses; and means for inhibiting said cable movement pulses when said bistable means is set, whereby the rate of said corrected pulses is representative of the rate of movement of a tool in a borehole.

8. Apparatus for determining the change in position of a tool supported by a cable in a borehole, comprising:
(a) means for generating cable movement pulses representative of incremental movement of a cable;
(b) means for counting said cable movement pulses and generating a correction pulse upon a predetermined number of said cable movement pulses being counted; and
(c) correction means responsive to said correction pulse for correcting said cable movement pulses, said correction means including bistable means adapted to be set by said correction pulse and reset by said cable movement pulses; and means for inhibiting said cable movement pulses when said bistable means is set to produce corrected cable movement pulses, whereby the rate of the corrected cable movement pulses is more accurately representative of the rate of movement of a tool supported by a cable.

9. Apparatus for determining the change in position of a tool supported by a cable in a borehole, comprising:
(a) means for generating cable movement pulses representative of incremental movement of a cable;
(b) counting means for counting said cable movement pulses;
(c) means coupled to said counting means for producing a correction pulse upon a predetermined first number of said cable movement pulses having been counted;
(d) correction means responsive to said correction pulses for correcting said cable movement pulses, whereby the rate of said corrected pulses is more accurately representative of the rate of movement of a tool supported by a cable;
(e) means coupled to said counting means and adapted for inhibiting said correction pulses from being applied to said correction means upon a second number of said cable movement pulses having been counted and thereafter enabling said correction pulses to be applied to said correction means upon a predetermined third number of said cable movement pulses having been counted; and
(f) means coupled to said counting means for selecting said second number of pulses necessary to inhibit the application of said correction pulses to said correction means in accordance with a known correction function.

10. Apparatus for determining the change in position of a tool supported by a cable in a borehole, comprising:
(a) means for generating cable movement pulses representative of incremental movement of a cable;
(b) counting means for counting said cable movement pulses and generating first and second output signals after a first and second number of said cable movement pulses have been counted;
(c) correction means responsive to correction pulses for correcting said cable movement pulses, whereby the rate of said corrected pulses is more accurately representative of the rate of movement of a tool supported by a cable;
(d) selectable means for producing a third output signal after a third number of said cable movement pulses have been counted, said third number being selectable in accordance with a given correction function;
(e) gating means for gating said first output signals to said correction means as said correction pulses; and
(f) bistable means responsive to said third output signal for disabling said gating means and said second output signal for enabling said gating means whereby correction pulses will be applied to said correction means only while said gating means is enabled.

11. The apparatus of claim 10 wherein said correction means includes bistable means adapted to be set by said correction pulses and reset by said cable movement pulses; and means for inhibiting said cable movement pulses when said bistable means is set.

12. Apparatus for determining the change in position of a tool supported by a cable in a borehole, comprising:
(a) means for generating cable movement pulses representative of incremental movement of a cable;
(b) means for measuring the tension in a cable;
(c) means responsive to said measured tension and cable movement for producing a signal in analog form;
(d) means for periodically digitizing said analog signal;
(e) digital means for comparing said digitized analog signal with another digital signal and generating a first output signal upon said two compared signals being unequal and a second output signal representative of which compared signal is greater in magnitude;
(f) means responsive to said first output signal for producing a correction pulse;
(g) bidirectional counter means for counting said correction pulses to produce said other digital signal which is compared with said digitized third signal, said second output signal determining the direction of count; and
(h) correction means responsive to said correction pulses and said cable movement pulses for producing corrected cable movement pulses which are more accurately representative of the changes in position of a tool in a borehole.

13. A method of placing reference marks on a cable in a borehole, comprising:
(a) moving a tool supported by a cable through a borehole;

(b) generating a first signal representative of cable movement in response to the movement of a cable;

(c) generating a second signal representative of a cable length correction function;

(d) combining said first and second signals to produce a third signal which is more accurately representative of cable movement; and (e) electrically accumulating representations of said third signal and placing reference marks along the length of a cable in response to predetermined accumulations of said third signal.

14. A method of placing reference marks on a cable in a borehole, comprising:

(a) generating a series of pulses representative of cable movement in response to the movement of a cable at the surface of the earth, each pulse being representative of a given increment of cable movement;

(b) generating a signal representative of a cable length correction function;

(c) correcting said series of pulses in response to said correction signal to produce a corrected series of pulses which are more accurately representative of cable movement;

(d) counting said corrected series of pulses and generating an output signal upon a predetermined number of pulses being counted; and (e) placing a reference mark on a cable in response to said output signal.

15. A method of placing reference marks on a cable in a borehole, comprising:

(a) generating a first signal representative of cable movement in response to the movement of a cable;

(b) measuring the tension in a cable and producing a tension signal representative of said measured tension;

(c) combining said first and tension signals to produce a second signal which is more accurately representative of cable movement; and (d) electrically accumulating representations of said third signal and placing reference marks along the length of a cable in response to said accumulations of said second signal.

16. A method of placing reference marks on a cable in a borehole, comprising:

(a) generating a series of pulses representative of cable movement in response to the movement of a cable at the surface of the earth, each pulse being representative of a given increment of cable movement;

(b) measuring the tension in a cable;

(c) correcting said series of pulses in response to said measured tension to produce a corrected series of pulses which are more accurately representative of cable movement;

(d) counting said corrected pulses and generating an output signal upon a predetermined number of pulses being counted; and (e) placing a reference mark on a cable in response to said output signal.

17. A method of placing reference marks on a cable in a borehole, comprising:

(a) generating a series of pulses representative of cable movement in response to the movement of a cable at the surface of the earth;

(b) generating a correction pulse representative of a cable length correction function at selected intervals of cable movement in response to said cable movement;

(c) correcting said series of pulses in response to said correction pulse to produce a corrected series of pulses which are more accurately representative of cable movement;

(d) counting said corrected series of pulses and generating an output signal upon a predetermined number of pulses being counted; and (e) placing a reference mark on a cable in response to said output signal.

18. A method of placing reference marks on a cable in a borehole, comprising:

(a) generating a series of pulses representative of cable movement in response to the movement of a cable at the surface of the earth;

(b) measuring the tension on a cable;

(c) generating first pulses at given increments of cable movement in response to said measured tension;

(d) counting said first pulses and generating a tension correction pulse upon a predetermined number of said first pulses being counted;

(e) generating a calibration correction pulse at given increments of cable movement;

(f) correcting said series of pulses to produce a corrected series of pulses in response to said tension and calibration correction pulses;

(g) counting said corrected series of pulses and generating an output signal upon a predetermined number of said corrected series of pulses being counted; and (h) placing a reference mark on a cable in response to said output signal.

References Cited

UNITED STATES PATENTS

| | | | |
|---|---|---|---|
| 2,794,951 | 6/1957 | Broding et al. | 33—127X |
| 2,806,372 | 9/1957 | Arps | 33—134X |
| 2,934,695 | 4/1960 | Maulsby | 33—127X |
| 3,027,649 | 4/1962 | Sloan | 324—34X |

WILLIAM D. MARTIN, Jr., Primary Examiner

U.S. Cl. X.R.

33—126; 324—34; 73—151